United States Patent [19]
Rouillot

[11] Patent Number: 5,553,964
[45] Date of Patent: Sep. 10, 1996

[54] MECHANICAL TUBULAR ELEMENT SUCH AS TRANSMISSION SHAFT OF A MOTOR VEHICLE

[75] Inventor: Michel Rouillot, St Germain En Laye, France

[73] Assignee: GKN Automotive AG, Lohmar, Germany

[21] Appl. No.: 432,506

[22] Filed: May 1, 1995

Related U.S. Application Data

[63] Continuation of Ser. No. 131,994, Oct. 4, 1993, abandoned.

Foreign Application Priority Data

Oct. 6, 1992 [FR] France .................. 92 11838

[51] Int. Cl.$^6$ ............................... F16B 11/00; F16D 1/06
[52] U.S. Cl. .................. 403/279; 29/525; 285/256; 285/382; 403/274; 403/404; 464/181; 464/183
[58] Field of Search .................... 285/256, 382, 285/405, 174, 239; 403/274, 277, 278, 279, 280, 281, 282, 404; 464/181, 183, 903; 29/419.1, 450, 453, 525, 888.08

[56] References Cited

U.S. PATENT DOCUMENTS

| | | | |
|---|---|---|---|
| 602,617 | 4/1898 | Dale | 285/256 X |
| 1,962,060 | 6/1934 | Emery, Jr. | 285/256 X |
| 3,711,130 | 1/1973 | Betzler | 285/239 |
| 3,794,360 | 2/1974 | Bachle et al. | 285/256 |
| 4,065,339 | 12/1977 | Lippert et al. | 285/405 X |
| 4,171,626 | 10/1979 | Yates et al. | 464/181 |
| 4,248,062 | 2/1981 | McLain et al. | 464/181 |
| 4,259,382 | 3/1981 | Schwan | 464/181 X |
| 4,275,122 | 6/1981 | Fisher | 285/423 X |
| 4,428,602 | 1/1984 | Lambot et al. | 285/423 X |
| 4,527,978 | 7/1985 | Zackrisson | 464/183 |
| 4,664,424 | 5/1987 | Smith | 285/256 |
| 4,769,897 | 9/1988 | Moseman | 285/382 X |
| 4,779,902 | 10/1988 | Lee | 285/423 X |
| 4,792,320 | 12/1988 | Nickel | 464/181 |
| 4,907,829 | 3/1990 | Spangenberg | 285/405 X |
| 5,222,915 | 6/1993 | Petrzelka et al. | 464/181 |
| 5,253,947 | 10/1993 | Petrzelka et al. | 403/274 |
| 5,309,620 | 5/1994 | Shinohara et al. | 403/282 X |

FOREIGN PATENT DOCUMENTS

| | | |
|---|---|---|
| 405245 | 1/1991 | European Pat. Off. . |
| 7932590 | 7/1983 | Germany . |
| 3230116 | 2/1984 | Germany . |
| 4107222 | 4/1992 | Germany . |
| 4201799 | 7/1993 | Germany ............... 285/382 |
| 2207732 | 2/1989 | United Kingdom . |

*Primary Examiner*—Kenneth J. Dorner
*Assistant Examiner*—Andrea Chop
*Attorney, Agent, or Firm*—Harness, Dickey & Pierce

[57] ABSTRACT

The tubular element is of the type comprising a tube which is composed of a synthetic material reinforced with fibers and has at least one end provided with a metal terminal member having a portion received inside the end portion of the tube. According to the invention, the outer cylindrical surface of the portion of the terminal member is stepped and has a first section whose outside diameter is greater than the inside diameter of a first section of the end portion of the tube in which it is received, and a second section whose outside diameter is reduced and less than or equal to the inside diameter of a second section of the end portion of the tube. The second section, in the assembled state of the tube and terminal member, extends axially in facing relation to the second section of the stepped surface of the portion of the terminal member.

24 Claims, 3 Drawing Sheets

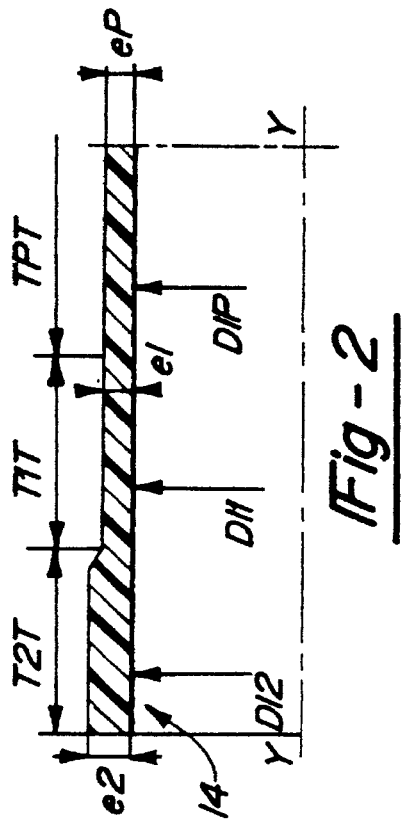
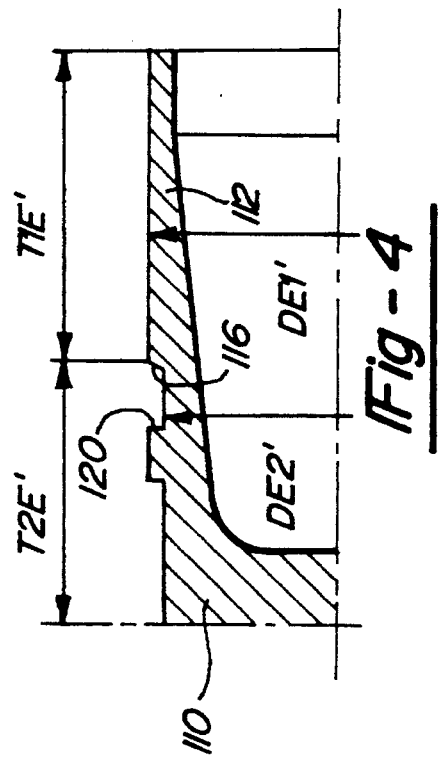
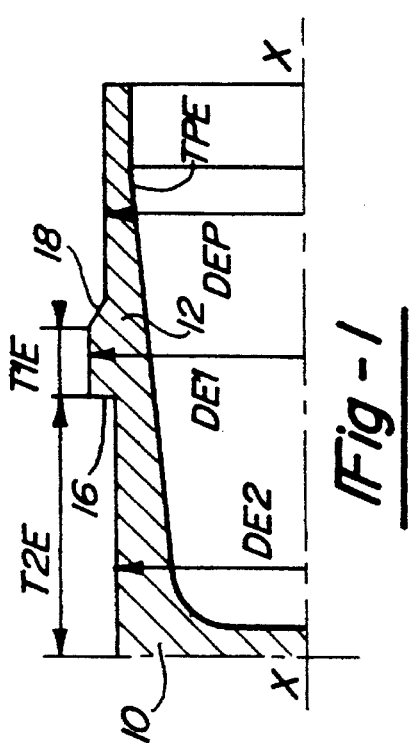
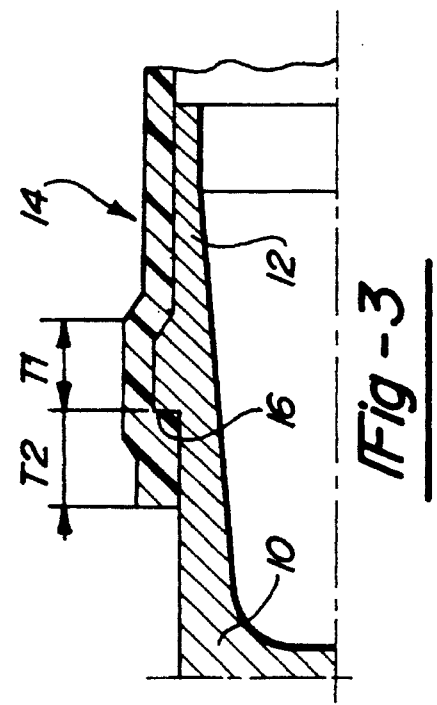

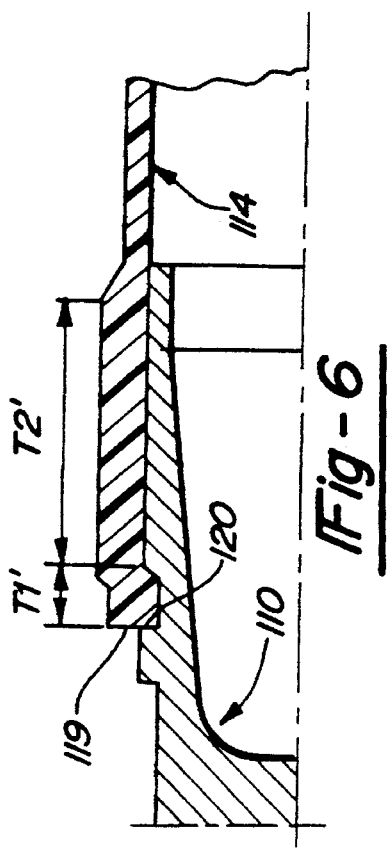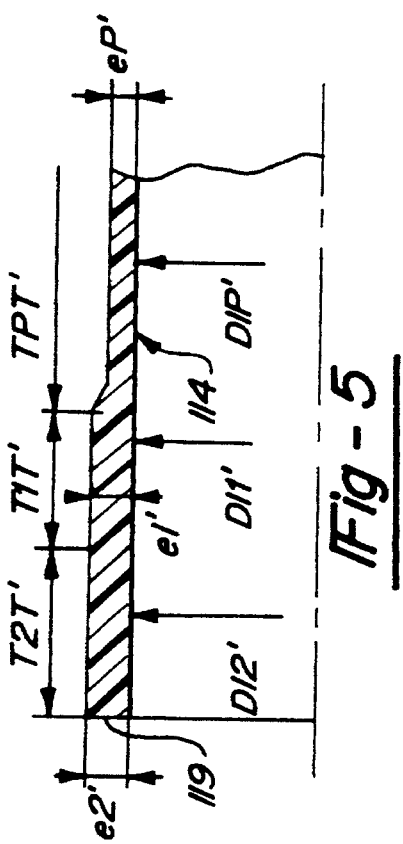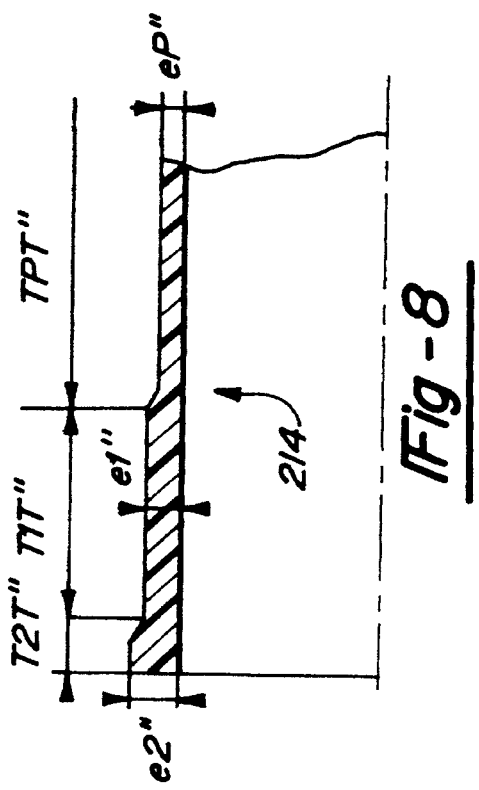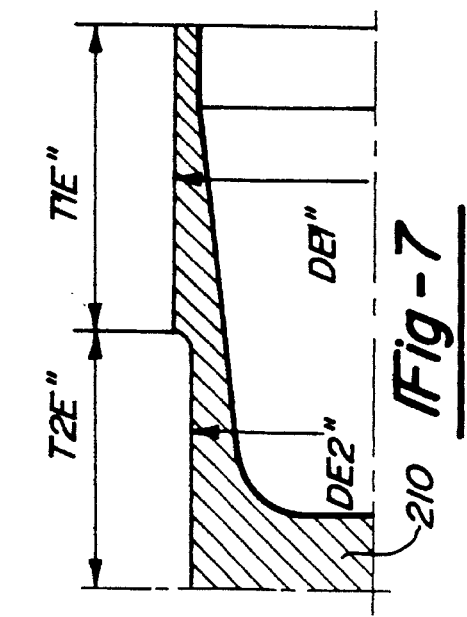

5,553,964

MECHANICAL TUBULAR ELEMENT SUCH AS TRANSMISSION SHAFT OF A MOTOR VEHICLE

This is a continuation of U.S. patent application Ser. No. 08/131,994 filed Oct. 4, 1993, now abandoned.

The present invention relates to a mechanical element having a generally tubular shape.

The invention relates more particularly to a transmission shaft, for example of a motor vehicle, commonly termed a composite shaft, i.e. a tube composed of synthetic material reinforced with fibers.

The ends of the composite tube are usually each provided with a terminal member having a portion whose outer section is complementary to the inner section of the end portion of the tube and is received in the latter.

These sections are for example of circular cylindrical shape.

The technique of making the terminal member a force fit in the tube permits in particular, according to the teaching of document FR-A-2,620,182, effectively and reliably ensuring the transmission of the torque between the terminal member and the composite tube.

To this end, the length of the portion of the terminal member fitted in the end portion of the tube is for example 40 mm for an inside diameter of the end portion of the tube of about 80 mm.

When such a transmission shaft is employed in the longitudinal position in a vehicle of the propelled type or of the type having four driving wheels, it may be necessary to ensure that the terminal member does not move out of the tube in the event of the transmission shaft being subjected to unusual axial tensile forces resulting for example from the blocking or jamming of a complementary component of the transmission, such as a sliding joint or a splined slide.

An object of the present invention is to provide an elongated mechanical element of tubular shape in which the design of the assembly between the terminal member and the end portion of the tube axially retains in a reliable manner the tube relative to the terminal member.

The invention therefore provides a mechanical element, for example for a motor vehicle, of the type comprising a tube which is composed of a synthetic material reinforced with fibers and has at least one end provided with a metal terminal member having a portion received inside the end portion of the tube, characterized in that the outer cylindrical surface of the portion of the terminal member is stepped and comprises a first section having an outside diameter greater than the inside diameter of a first section of the end portion of the tube in which it is received, and a second section having an outside diameter which is reduced and less than or equal to the inside diameter of a second section of the end portion of the tube which, in the assembled position, extends axially in facing relation to the second section of the stepped outer cylindrical surface of the terminal member.

According to other features of the invention:

the first section and second section of the stepped outer cylindrical surface of the terminal member are two consecutive sections separated by a substantially radial shoulder;

the inside diameters of the first section and second section of the end portion of the tube are equal;

the inside diameter of the first section of the tube is greater than the inside diameter of the second section of the tube, said two sections of the tube being separated by a substantially radial shoulder;

the reinforcing fibers of the second section of the end portion of the tube are wound at a winding angle, measured with respect to the longitudinal direction of the tube, which is greater than 75° and preferably equal to 90°;

the reinforcing fibers of the first section of the end portion of the tube are wound at a winding angle, measured with respect to the longitudinal direction of the tube, which is greater than 75° and preferably equal to 90°;

the end portion of the tube has a constant thickness;

the tube comprises a main wall portion which extends throughout its length and has reinforcing fibers wound at a winding angle, measured with respect to the longitudinal direction of the tube, which is preferably between 0 and ±45°, and the end portion of the tube comprises at least one additional wall portion having reinforcing fibers wound at a winding angle, measured with respect to the longitudinal direction of the tube, which is greater than 75° and preferably equal to 90°;

the additional wall portion extends throughout the length of the end portion of the tube;

the additional wall portion extends substantially throughout the length of the second section of the tube;

the additional wall portion extends outside the main wall portion of the tube;

the thickness of the additional wall portion is substantially constant;

the thickness of the additional wall portion which extends along the length of the second section of the tube is greater than the thickness of the additional wall portion which extends along the length of the first section of the tube;

the additional wall portion extends inside the main wall portion of the tube;

said stepped cylindrical surface has a circular and/or polygonal sectional shape.

Further features and advantages of the invention will be apparent from the following detailed description with reference to the accompanying drawings in which:

FIG. 1 is a partial axial sectional view of a first embodiment of a terminal member in the construction of a transmission shaft;

FIG. 2 is a partial axial sectional view of a first embodiment of the end portion of the composite tube for assembly with the terminal member shown in FIG. 1;

FIG. 3 is an axial sectional view of the terminal member shown in FIG. 1 and the end portion of the tube shown in FIG. 2 in the assembled position;

FIGS. 4 to 6 are views similar to FIGS. 1 to 3 of a first alternative embodiment of the invention;

FIGS. 7 and 8 are views similar to FIGS. 1 and 2 of a second alternative embodiment of the invention;

Figure 10:
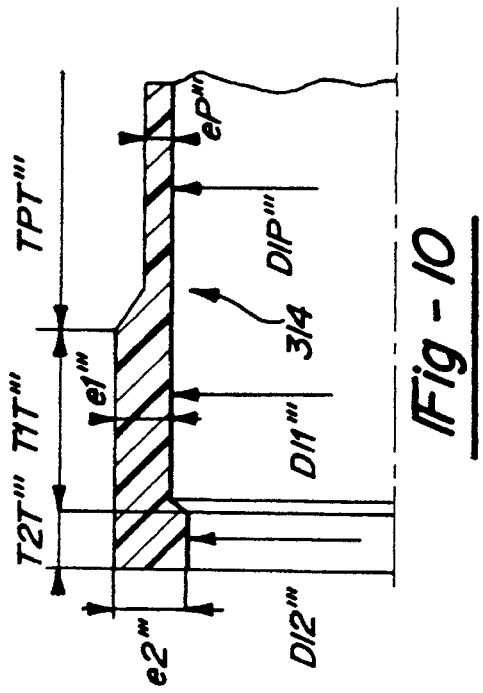
FIGS. 9 and 10 are views similar to FIGS. 1 and 2 of a third alternative embodiment of the invention.

Shown in FIG. 1 is a metal terminal member 10 which is of revolution about an axis X—X and comprises a cylindrical tubular portion 12 which is intended to be placed inside the end portion of the composite tube 14 shown in FIG. 2.

The portion 12 of the terminal member 10 comprises a main section TPE, a first assembly section T1E and a second assembly section T2E.

In the embodiment shown in FIG. 1, the first section T1E is in the form of an outer radial flange whose outside diameter DE1 is larger than the outside diameter DE2 of the second section T2E.

The two consecutive sections T1E and T2E constitute a stepped portion of the cylindrical outer surface of the portion 12 of the terminal member and are separated by a radial shoulder 16.

The first section T1E and the main section TPE are interconnected by an inserting chamfer 18.

The composite tube 14 shown in FIG. 2 is a cylindrical tube made from a matrix composed of synthetic material, for example which is thermoplastic or thermosetting, reinforced with continuous fibers and formed for example by a filamentary or thread winding.

The tube 14 comprises a main section TPT which extends substantially throughout the length of the tube, the end portion of the tube 14 for connection with the terminal member 10 having two consecutive sections T1T and T2T.

In the embodiment shown in FIG. 2, the inside diameter of the tube 14 is constant throughout its length so that the inside diameter DIP of the main section TPT is equal to the inside diameter DI1 of the first section T1T and equal to the inside diameter DI2 of the second section T2T.

In this embodiment, the thickness eP of the main section is equal to the thickness e1 of the first section T1T and is less than the thickness e2 of the second section T2T.

According to the invention, the relative dimensions are such that:

DE1>DI1

DE2≦DI2

DI1=DI2=DIP eP=e1<e2.

In the assembled position of the terminal member and tube, as shown in FIG. 3, the cooperation of the first sections T1T and T1E therefore constitutes a force fit which is capable of ensuring the transmission of the torque between the two elements as disclosed for example in document FR-A-2,620,182.

The torque is therefore transmitted in the zone T1 of interference fit between the diameters DE1 and DI1.

In order to increase the torque transmitting capacity, the outside diameter DEP of the section TPE of the terminal member may also be made greater than the inside diameter DIP of the main section TPT of the tube 14.

The second section T2T of the tube extends in facing relation to or alongside the second section T2E of the terminal member beyond the radial shoulder 16 with no radial gripping effect so as to axially retain the end portion of the tube 14 relative to the terminal member 10 in accordance with the teaching of the invention.

As there is no interference between the diameters DE2 and DI2 of the second sections T2E and T2T, in the zone T2, the section T2T of the end portion of the tube 14 will not be subjected to any creep force in operation of the shaft when transmitting torque, and this section will conserve all its elastic capabilities for, if need be, resisting the tensile forces which would tend to separate the terminal member 10 and the tube 14.

The association of a tube composed of a composite material with a metal terminal member is particularly advantageous for both the transmission of the torque and the axial retaining function inasmuch as the elastic range of the tube material is very wide and permits, when obtaining the force fit, the passage of the second section T2T beyond the first section T1E without adversely affecting the properties of the material. In the course of this fitting operation, the entire elastic range may be used.

The choice of the composite material is also particularly advantageous in that the value of the yield point of the material is substantially equal to the tensile strength of the reinforcing fibers.

Moreover, the terminal member is particularly simple to produce in that it is sufficient to guarantee that the diameters DE1 and DI1 differ by 0.5 to 0.6 mm from each other for a mean diameter of between 70 and 80 mm, which requires merely simple machining operations on the outer stepped cylindrical surface of the terminal member, for example by turning.

In comparison, in the case of fitting a metal terminal member in a metal tube, a diametrical interference on the order of a hundredth of a millimeter must be provided, with difficulties which arise in the machining of the two elements.

The composite tube 14 is in general constructed with the aid of reinforcing fibers composed of a polyamide or carbon material, the winding angle of which, measured with respect to the longitudinal axis Y—Y of the tube, is for example between 0 and ±45° depending on the torsional and bending capacities to be given to the tube.

Thus the tube comprises, throughout its length, a main wall portion in which the thickness eP is substantially constant and the fibers are oriented at a small angle.

However, for the purpose of improving the torque transmitting and axial retaining performances, it may be desirable to orient, in the zone of the section T1T and/or of the section T2T, the fibers with a distinctly larger winding angle, exceeding 75° and preferably equal to 90°.

This modification in the orientation of the fibers may be effected with a constant thickness, during the procedure for constructing the tube by the filamentary winding technique, and/or by increasing the thickness of the tube in its end portion, thereby forming an additional wall portion which, in the embodiment shown in FIG. 2, is an outer annular cylindrical additional wall portion which surrounds the main wall portion and corresponds to the thickness difference e2-e1.

The first section T1T has a thickness equal to the thickness of the main section TPT but its fibers are oriented substantially at 90°.

In the alternative embodiment shown in FIGS. 4 to 6, the portion 112 of the terminal member 110 has only two consecutive sections T1E' and T2E'.

The end portion of the tube 114 is constituted by two consecutive sections T1T' and T2T' whose thicknesses e1' and e2' are equal to and greater than the thickness eP' of the main section TPT', while the inside diameters DI1' and DI2' of the two sections are equal to the inside diameter DIP'.

According to the invention, and as in the case of the first embodiment:

DE1'>DI1'

DE2'≦DI2'.

In this first alternative embodiment, the end portion of the tube 114 therefore also has an outer additional wall portion corresponding to the difference in the thicknesses e2'(or e1')-eP'.

In this alternative embodiment, the free end 119 of the tube 114 is also arranged in facing relation to or alongside an outer radial shoulder 120 of the terminal member 110 with which it is cooperative to facilitate the transmission of axial forces which tend to subject the tube 114 to axial compression.

In the second alternative embodiment shown in FIGS. 7 and 8, the terminal member is similar in design to the terminal member shown in FIG. 4 except for the elimination of shoulder 120 while the thicknesses of the sections of the tube 214 are such that:

eP"<e1"<e2".

The first section T1T" therefore has an outer additional wall portion whose thickness equals e1"-eP", while the second section T2T" has an outer additional wall portion whose thickness equals e2"-eP".

Figure 9:
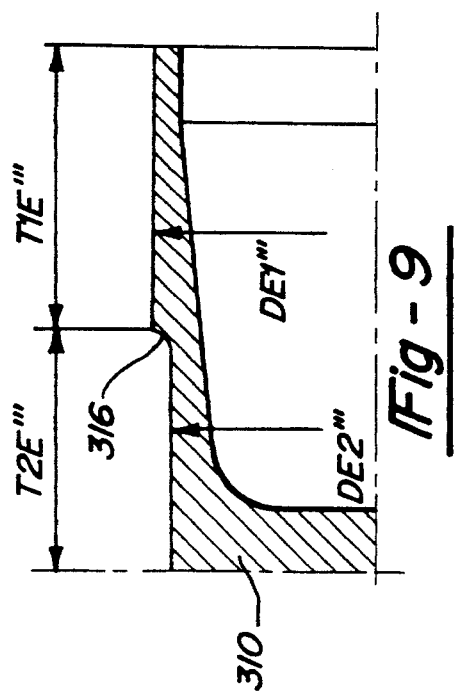

In the third alternative embodiment shown in FIGS. 9 and 10, the terminal member 310 is identical in design to that illustrated in FIG. 7, while the dimensions of the tube 314 are such that:

$eP''' < e1''' < e2'''$ $DI1''' = DIP'''$ $DI2''' < DI1'''$ $DE1''' > DI1'''$ $DE2''' \leq DI2'''$.

The second section T2T''' therefore has an inner additional wall portion which cooperates with the shoulder 316 for performing the axial retaining function.

The first section T1T''' has an outer additional wall portion corresponding to the difference in the thicknesses $e1''' - eP'''$, this outer additional wall portion also extending axially in the region of the second section T2T'''.

Figure 11:
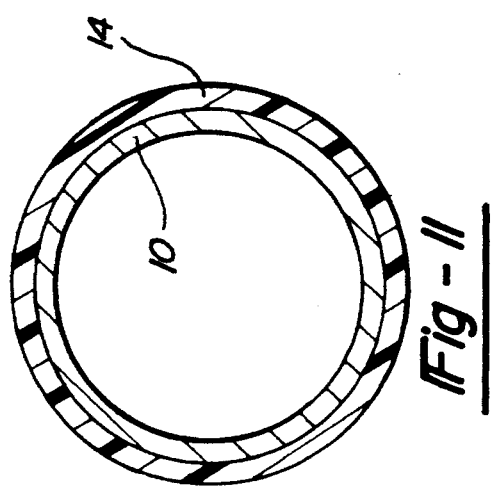
FIG. 11 is a cross-sectional view through the terminal member shown in FIG. 1.

In the various embodiments just described, the complementary sections of the terminal member and the tube are circular as shown in FIG. 11.

Figure 12:
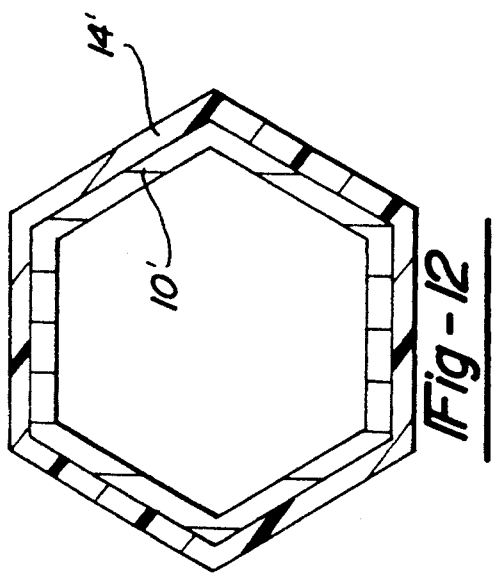
FIG. 12 is a cross-sectional view similar to FIG. 11 according to another embodiment of the present invention.

It must be understood that the scope of the invention is not intended to be limited to this type of section, since the directrix of the associated cylindrical sections may be for example polygonal so as to perform the torque transmitting function as shown in FIG. 12 which illustrates a terminal member 10' and a composite tube 12'.

In this case, the notions of diameters such as those employed in the foregoing description must be interpreted in a corresponding manner, i.e. in terms of dimensional differences between the complementary shapes producing the same axial retaining effect. The scope of the invention is not intended to be limited to the case of a torque transmitting shaft, since it is equally applicable to any type of mechanical tubular element, such as for example a reaction tube, a connecting rod, a torsion bar, a beam or girder subjected to bending stress, etc.

What is claimed is:

1. Torque transmitting tubular element, comprising in combination:

a tube which is composed of synthetic material and fibers reinforcing said material and has an end portion, and a metal terminal member having an inner portion received inside said end portion of said tube, said end portion of said tube comprising a tube first section and a tube second section, said tube second section being located between said tube first section and an end face of the tube, said inner portion of said terminal member having a generally cylindrical stepped outer surface comprising a member first section having an outside diameter greater than the inside diameter of said tube first section and being received inside said tube first section with an interference fit in an assembled state of said tube and said terminal member for transmission of torque between said tube and said terminal member, said stepped outer surface of said terminal member further comprising a member second section having an outside diameter which is less than said outside diameter of said member first section and is at most equal to the inside diameter of said tube second section, said tube second section, in said assembled state of said tube and said terminal member, axially extending in facing relation to said member second section, whereby, in said assembled state, said tube first section exerts radially gripping action of said member first section while said tube second section exerts no gripping action on said member second section.

2. Torque transmitting tubular element according to claim 1, wherein said member first section and said member second section are two consecutive sections and said terminal member includes a substantially radial shoulder interposed between said member first and second sections.

3. Torque transmitting tubular element according to claim 1, wherein said inside diameters of said tube first section and said tube second section are equal.

4. Torque transmitting tubular element according to claim 1, wherein said inside diameter of said tube first section is greater than said inside diameter of said tube second section.

5. Torque transmitting tubular element according to claim 1, wherein said reinforcing fibers of said tube second section are wound at a winding angle, measured with respect to the longitudinal direction of said tube, which is greater than 75°.

6. Torque transmitting tubular element according to claim 5, wherein said winding angle is 90°.

7. Torque transmitting tubular element according to claim 1, wherein said reinforcing fibers of said tube first section are wound at a winding angle, measured with respect to the longitudinal direction of said tube, which is greater than 75°.

8. Torque transmitting tubular element according to claim 7, wherein said winding angle is 90°.

9. Torque transmitting tubular element according to claim 1, wherein said end portion of said tube has a constant thickness.

10. Torque transmitting tubular element according to claim 1, wherein said tube comprises a main wall portion adjacent to said end portion and extending substantially throughout the remaining length of said tube and having reinforcing fibers which are wound at a winding angle, measured with respect to the longitudinal direction of said tube, which is between 0 and ±45°, and said end portion of said tube has at least one additional wall portion having reinforcing fibers which are wound at a winding angle, measured with respect to the longitudinal direction of said tube, which is greater than 75°.

11. Torque transmitting tubular element according to claim 10, wherein said winding angle greater than 75° is 90°.

12. Torque transmitting tubular element according to claim 10, wherein said additional wall portion extends throughout the length of said end portion of said tube.

13. Torque transmitting tubular element according to claim 12, wherein said additional wall portion extends outside said main wall portion of said tube.

14. Torque transmitting tubular element according to claim 13, wherein the thickness of said additional wall portion is substantially constant.

15. Torque transmitting tubular element according to claim 13, wherein the thickness of said additional wall portion which extends along the length of said tube second section is greater than the thickness of said additional wall portion which extends along the length of said tube first section.

16. Torque transmitting tubular element according to claim 12, wherein the thickness of said additional wall portion is substantially constant.

17. Torque transmitting tubular element according to claim 12, wherein the thickness of said additional wall portion which extends along the length of said tube second section is greater than the thickness of said additional wall portion which extends along the length of said tube first section.

18. Torque transmitting tubular element according to claim 10, wherein said additional wall portion extends substantially throughout the length of said tube second section.

19. Torque transmitting tubular element according to claim 18, wherein said additional wall portion extends outside said main wall portion of said tube.

20. Torque transmitting tubular element according to claim 18, wherein the thickness of said additional wall portion is substantially constant.

21. Torque transmitting tubular element according to claim 18, wherein the thickness of said additional wall portion which extends along the length of said tube second section is greater than the thickness of said tube first section.

22. Torque transmitting tubular element according to claim 13, wherein said additional wall portion extends inside said main wall portion of said tube.

23. Torque transmitting tubular element according to claim 1, wherein said cylindrical surface has a circular cross-sectional shape.

24. Torque transmitting tubular element according to claim 1, wherein said cylindrical surface has a polygonal cross-sectional shape.

* * * * *